United States Patent [19]

Luechinger

[11] Patent Number: 4,676,327

[45] Date of Patent: Jun. 30, 1987

[54] PRECISION SCALE OF THE ELECTRONIC SIGNAL PROCESSING TYPE HAVING AN AUXILIARY KEYBOARD

[75] Inventor: Paul Luechinger, Uster, Switzerland

[73] Assignee: Mettler Instrumente AG, Greifensee, Switzerland

[21] Appl. No.: 838,601

[22] Filed: Mar. 11, 1986

[30] Foreign Application Priority Data

Apr. 12, 1985 [CH] Switzerland .................. 1568/85

[51] Int. Cl.⁴ .................................. G01G 21/00
[52] U.S. Cl. ............................ 177/126; 177/128; 364/189
[58] Field of Search ........................ 177/2–13, 177/128, 126, 127; 364/189, 466

[56] References Cited

U.S. PATENT DOCUMENTS 4,084,242 4/1978 Conti .
4,601,355 7/1986 Takahashi ................ 364/466 X

FOREIGN PATENT DOCUMENTS 8212927 8/1982 Fed. Rep. of Germany .
3325647 9/1984 Fed. Rep. of Germany .

Primary Examiner—George H. Miller, Jr.
Attorney, Agent, or Firm—Laubscher & Laubscher

[57] ABSTRACT

A precision scale of the electronic signal processing type includes a housing (5) containing a weighing chamber (3) and having a main keyboard (7) integral with or rigidly connected to the housing, characterized by the provision of an auxiliary keyboard (17) mounted within a recess (29) contained in the housing beneath the main keyboard for displacement between retracted inoperative and extended operative positions relative to the main keyboard.

6 Claims, 3 Drawing Figures

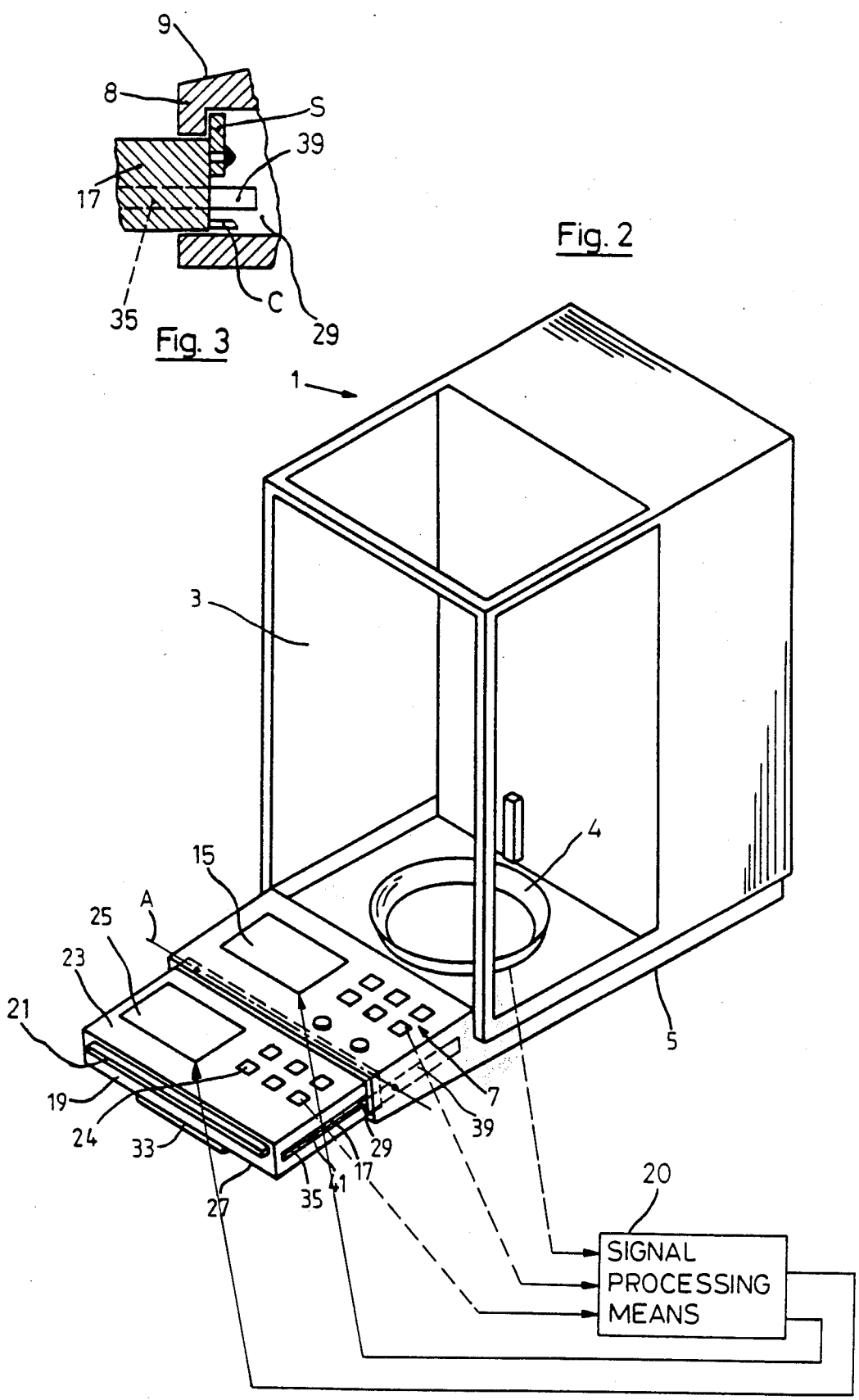

PRECISION SCALE OF THE ELECTRONIC SIGNAL PROCESSING TYPE HAVING AN AUXILIARY KEYBOARD

BRIEF DESCRIPTION OF THE PRIOR ART

As evidenced by the prior U.S. Pat. No. 4,084,242 to Conti, it is known to provide an electronic postage weighing scale in which the storage memory means for the postal rate table is arranged in an extensible and retractable drawer mounted for movement in a recess contained in the housing beneath the keyboard, which drawer can be pulled out to permit the user, in the event of frequently recurring postal rate changes, to easily exchange the associated printed circuit boards, whereby the scale does not have to be removed from its operating location for adjustment and/or recalibration.

Moreover, it is known in the art, as shown, for example, by the German Gebrauchsmuster No. 82 12 927.4, to place the keyboard in a drawer arranged beneath the visual display screen, whereby the keyboard may be inserted into its retracted position below the keyboard when not in use, and thus be protected against dust and other contaminates. The keyboard contains all the elements necessary for operation of the apparatus, and consequently it must always be pulled out when the equipment is in operation. Therefore, there is no possibility of equipping the visual display unit only with one keyboard which includes only those elements that are absolutely necessary for use.

The present invention was developed to provide an improved weighing apparatus of the electronic signal processing type including an auxiliary keyboard that is easily accessible during use and which is retractable to a protected inoperative position within the scale housing during non-use.

SUMMARY OF THE INVENTION

Accordingly, a primary object of the present invention is to provide an improved precision scale of the electronic signal type including a housing containing a weighing chamber and having a main keyboard, and an auxiliary keyboard mounted in a recess contained in the housing beneath the main keyboard, said auxiliary keyboard being displaceable between an operative extended position and an inoperative retracted position relative to said housing.

As a consequence of the invention, it is possible to position the auxiliary keyboard, during use for either short or long periods of time, adjacent the main keyboard in the field of vision of the user, and during non-use, to retract the auxiliary keyboard to a protected position within the housing. Keys that are not needed constantly and which might disturb a user of the scale can thus be protected against unintentional operation in a simple and reliable manner.

According to another object of the invention, the auxiliary keyboard may be in the form of a drawer adapted for easy insertion within a corresponding recess contained within the scale housing. Longitudinal guide means may be provided for accurately guiding the auxiliary keyboard for displacement relative to the housing. Stop means are provided for preventing the inadvertent removal of the auxiliary keyboard from the scale housing.

According to more specific objects of the invention, the auxiliary keyboard means is provided adjacent its exposed end with supporting foot means for supporting the auxiliary keyboard when in the operative extended position. Handle means are provided on the exposed face of the auxiliary keyboard means for displacing the same between its retracted and extended positions. The keys on the auxiliary keyboard may be used to input additional information or control instructions into the signal processing means for which the keys of the main keyboard are insufficient. The main and auxiliary keyboards have parallel inclined surfaces, thereby to insure ergonomically perfect operation of the scale.

BRIEF DESCRIPTION OF THE DRAWING

Other objects and advantages of the invention will become apparent when viewed in the light of the accompanying drawing, in which:

FIG. 2 is a corresponding view with the auxiliary keyboard in its extended operative position; and FIG. 3 is a detailed sectional view illustrating the stop means for preventing inadvertent withdrawal of the auxiliary keyboard means from the housing.

DETAILED DESCRIPTION

Figure 1:
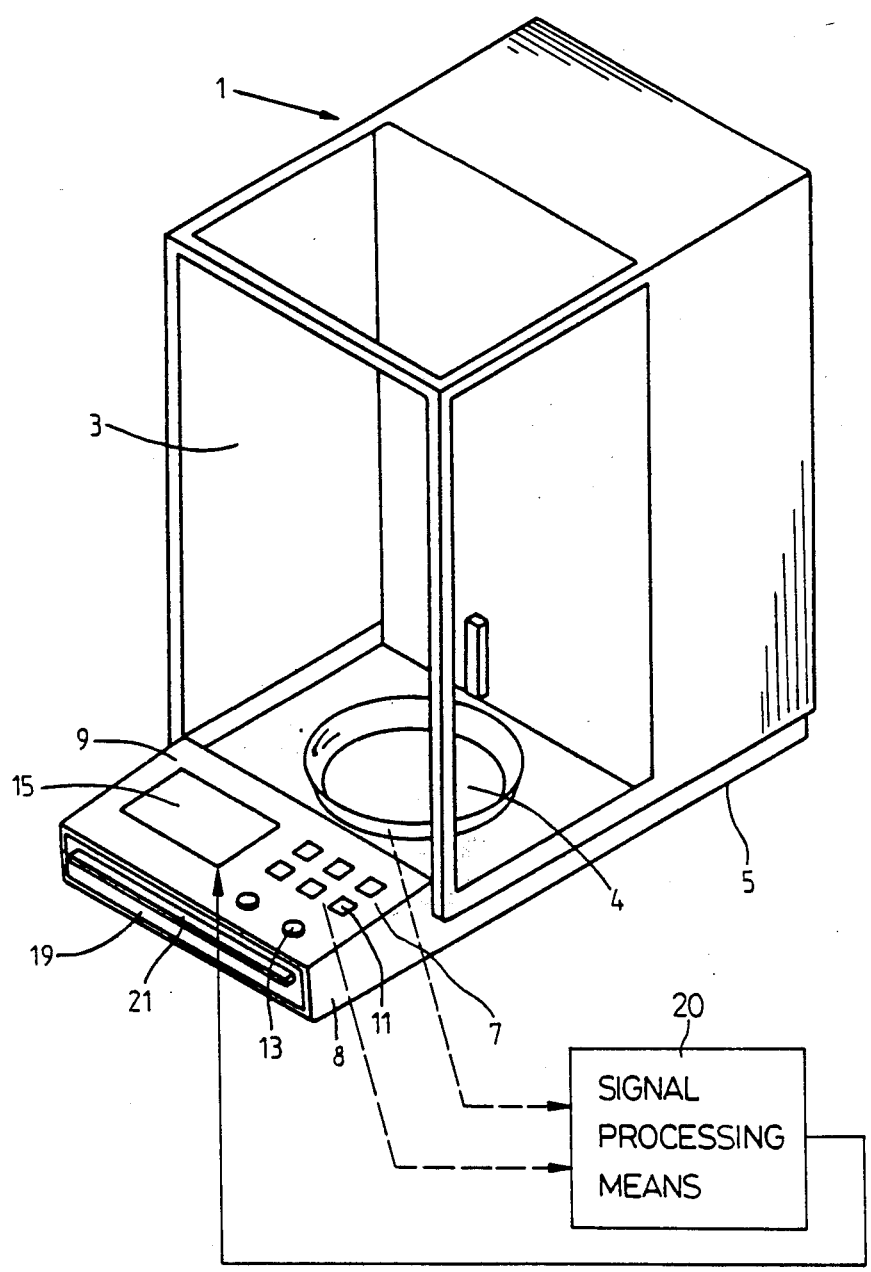
FIG. 1 is somewhat diagrammatic perspective view, with certain parts removed for clarity, of the improved precision weighing scale of the present invention, the auxiliary keyboard means being in its retracted inoperative position within the scale housing.

Referring first more particularly to FIG. 1, the precision weighing apparatus 1 is of the electronic signal processing type including a housing 5 containing a weighing chamber 3 for receiving a weighing pan that is adapted to be supported by movable pan support means (not shown). The housing includes a scale operating keyboard 7 for transmitting instruction or information signals to the signal processing means 20 of the weighing apparatus, which keyboard has an inclined upper surface 9 that contains the operating keys 11, control knobs, and visual display means 15, whereby the main functions of the scale—such as turning the scale on or off, zero adjustment and taring—can be performed. While the main keyboard has been illustrated as being integral with the housing, it could be a separate unit rigidly connected with the housing, if desired.

Mounted in a recess 29 contained in the housing casing portion 8 beneath the main keyboard 7 is an auxiliary keyboard 17 having an exposed front face 19 that closes the corresponding end of the housing, as shown in FIG. 1, which front face is provided with a handle or hand grip 21 for displacing the auxiliary keyboard between its inoperative retracted and operative extended positions, as shown in FIGS. 1 and 2, respectively.

The auxiliary keyboard 17 includes an inclined upper surface 23 that is parallel with the inclined upper surface 9 of the main keyboard 7, which surface 23 contains a plurality of operating keys 24 for sending signals to the signal processing means 20, and a visual display 15, the keys 24 being operable either to operate the weighing apparatus 1 during certain weighing applications, or which must be accessible for the adjustment of the scale prior to a specific weighing application thereof. In each case, the applications performed by the keys 24 are those that take place only sporadically, and not permanently.

The auxiliary keyboard 17 includes a housing 27 that can be inserted loosely within a recess 29 which is contained in the main housing 5 beneath the main keyboard 7. As shown in FIG. 3, stop means S are provided which prevent inadvertent removal of the auxiliary keyboard 17 from the recess 29 in housing 5. Foot means 33 are provided beneath the forward end portion of the auxiliary keyboard 17 adjacent the exposed front face 19, thereby to support the auxiliary keyboard when in the extended operative condition. Preferably the foot means 33 is centered beneath the forward edge of the housing 27 so that a defined support will be assured even in the event that the scale housing is arranged on an uneven supporting surface.

The auxiliary keyboard is preferably made in the form of a drawer which is suspended by longitudinal guide means 35, thereby to permit simple guided insertion within the recess 29. The longitudinal guide means 35 include first guide members 41 secured to the sides of the auxiliary keyboard for cooperation with corresponding roller or slide guides 39 secured to the scale housing 5, respectively, the slide means being designed to permit pivotal movement of the auxiliary keyboard—when in the extended condition—relative to the housing 5 about horizontal pivot axis A which extends normal to the longitudinal axis of displacement of the auxiliary keyboard. Thus, when the auxiliary keyboard is in its operative extended condition, it is continuously supported by the foot means 33, and, upon operation of the keys 24, cannot inadvertently be slid back into the recess 29. Guide members 41 may be attached to the sides of the auxiliary keyboard, or alternatively can be in the form of integral grooves or ribs, if desired.

According to a modified construction, the recess 29 may be provided in a side wall of the housing beneath main keyboard 7, whereupon the auxiliary keyboard, when extended from the housing, will be positioned laterally of the main keyboard, instead of in front of the same as shown in FIG. 2.

While the auxiliary keyboard is normally provided as part of the original equipment, it is apparent that it may be provided as additional accessory equipment operable for retrofit connection to the weighing apparatus as further elements and equipment (such as keys and dials) are required; it is also possible, if necessary, to insert additional or alternative operating modules into the additional operating unit.

The present invention avoids the drawback normally associated with cable-connected accessories, in that owing to the arrangement of the cable connections C within the recess 29, they are protected against the deleterious effects of chemically destructive media often found in a laboratory.

While the preferred forms and embodiments have been illustrated and described, it is apparent that various other changes may be made in the apparatus described without deviating from the invention disclosed above.

What is claimed is:

1. In a precision weighing apparatus of the electronic signal processing type including a scale housing (5) containing a weighing chamber (3) and having a casing (8) including main keyboard means (7) associated with the scale housing (5);

the improvement which comprises:
(a) auxiliary keyboard means (17) operatively associated with said main keyboard means;
(b) said auxiliary keyboard means being in the form of a drawer slidably mounted within a recess contained in said casing (8) beneath said main keyboard means for displacement between retracted inoperative and extended operative positions relative to said casing; and
(c) stop means (5) normally preventing removal of said auxiliary keyboard means from said recess when said auxiliary keyboard means in displaced from the retracted position to the extended position.

2. Apparatus as defined in claim 1, and further including longitudinal guide means (35) for guiding said auxiliary keyboard means for displacement relative to said casing.

3. Apparatus as defined in claim 1, wherein said auxiliary keyboard means, when in the retracted position, includes at least one exposed face, and further including hand grip means (21) mounted on the exposed face of said auxiliary keyboard means for displacing the same between its retracted and extended positions.

4. Apparatus as defined in claim 1, wherein said main and auxiliary keyboard means have parallel surfaces (9,25) each containing a plurality of operating keys, respectively, said parallel surfaces being inclined relative to the bottom surface of said scale housing.

5. In a precision weighing apparatus of the electronic signal processing type including a scale housing (5) containing a weighing chamber (3) and having a casing (8) including main keyboard means (7) associated with the scale housing;

the improvement which comprises
(a) auxiliary keyboard means (17) operatively associated with said main keyboard means;
(b) said auxiliary keyboard means being in the form of a drawer mounted within a recess (29) contained in said casing beneath said main keyboard means, said drawer being displaceable between retracted inoperative and extended operative positions relative to said casing;
(c) longitudinal guide means (35) for guiding said auxiliary keyboard means during the displacement thereof between said retracted and extended positions relative to said casing; said longitudinal guide means affording pivotal movement of said auxiliary keyboard means, when in the extended position, about a horizontal pivot axis (A) extending normal to the longitudinal axis of displacement of said auxiliary keyboard means; and
(d) foot means (33) for at least partially supporting said auxiliary keyboard means when in the extended position.

6. In a precision weighing apparatus of the electronic signal processing type including a scale housing (5) containing a weighing chamber (13) and having a casing (8) including main keyboard means (7) associated with the scale housing (5);

the improvement which comprises
(a) auxiliary keyboard means (17) operatively associated with said main keyboard means;
(b) said auxiliary keyboard means being mounted within a recess (29) contained in said casing (8) beneath said main keyboard means for displacement between retracted inoperative and extended positions relative to said casing;
(c) said auxiliary keyboard means including operating keys (24) and display means (25) each of which is operable when said auxiliary keyboard means is in its extended position.

* * * * *